(12) United States Patent
Klüver et al.

(10) Patent No.: US 7,957,221 B2
(45) Date of Patent: Jun. 7, 2011

(54) METHOD FOR OPTIMUM COMBINATION OF PRESSURE AND PARTICLE MOTION SENSORS FOR A 3-D SPREAD OF DUAL-SENSOR MARINE SEISMIC STREAMERS

(75) Inventors: Tilman Klüver, Sande (NO); Hocine Tabti, Østerås (NO); Anthony James Day, Drammen (NO)

(73) Assignee: PGS Geophysical AS, Lysaker (NO)

( * ) Notice: Subject to any disclaimer, the term of this patent is extended or adjusted under 35 U.S.C. 154(b) by 279 days.

(21) Appl. No.: 12/291,907

(22) Filed: Nov. 14, 2008

(65) Prior Publication Data
US 2010/0124148 A1    May 20, 2010

(51) Int. Cl.
*G01V 1/38* (2006.01)
(52) U.S. Cl. .................. 367/24; 367/21; 702/14; 702/17
(58) Field of Classification Search .................. 367/14, 367/15, 21, 24, 124; 702/13, 14, 17, 18
See application file for complete search history.

(56) References Cited

U.S. PATENT DOCUMENTS
6,314,371 B1  11/2001  Monk
7,359,283 B2   4/2008  Vaage et al.

FOREIGN PATENT DOCUMENTS
GB          2411722      9/2005
WO    WO 2008/134177   11/2008

OTHER PUBLICATIONS

Tilman Klüver, (2008), "Wavefield separation for dual-sensor data with local handling of aliased energy", SEG Law Vegas 2008 Annual Metting XP-002572134, pp. 1083-1087.
European Search Report, Mar. 9, 2010.

*Primary Examiner* — Jack Keith
*Assistant Examiner* — Daniel L Murphy
(74) *Attorney, Agent, or Firm* — E. Eugene Thigpen

(57) ABSTRACT

A method for determining upgoing pressure components of seismic signals from signals detected by combined pressure responsive sensors and motion responsive seismic sensors disposed in a plurality of laterally spaced apart streamers includes determining a threshold time at which angle of incidence error in the motion responsive signals in the cross-line direction falls below a selected threshold. Below the threshold time, the motion responsive signals are corrected for angle of incidence in the in-line and cross-line directions. Above the threshold time, the motion responsive signals are corrected for angle of incidence only in the in-line direction. Both sets of incidence corrected measured motion responsive signals, and the pressure responsive signals are used to determine upgoing or downgoing pressure components or upgoing or downgoing motion components of the measured motion responsive and pressure responsive seismic signals.

13 Claims, 6 Drawing Sheets

METHOD FOR OPTIMUM COMBINATION OF PRESSURE AND PARTICLE MOTION SENSORS FOR A 3-D SPREAD OF DUAL-SENSOR MARINE SEISMIC STREAMERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic surveying. More specifically, the invention relates to methods for processing signals acquired using streamers having both pressure responsive sensors and motion responsive sensors.

2. Background Art

In seismic exploration, geophysical data are obtained by applying acoustic energy to the earth from an acoustic source and detecting seismic energy reflected from interfaces between different layers in subsurface formations. The seismic wavefield is reflected when there is a difference in acoustic impedance between the layer above the interface and the layer below the interface. When using towed streamers in marine seismic exploration, one or more seismic streamers is towed behind an exploration vessel at a water depth typically between about six to about nine meters, but can be towed shallower or deeper. Hydrophones are included in the streamer cable for detecting seismic signals. A hydrophone is a submersible pressure gradient sensor that converts pressure waves into electrical or optical signals that are typically recorded for signal processing, and evaluated to estimate characteristics of the subsurface of the earth.

In a typical geophysical exploration configuration, a plurality of streamer cables are towed behind a vessel. One or more seismic sources are also normally towed behind the vessel. The seismic source, which typically is an airgun array, but may also be a water gun array or other type of source known to those of ordinary skill in the art, transmits seismic energy or waves into the earth and the waves are reflected back by reflectors in the earth and recorded by sensors in the streamers. Paravanes are typically employed to maintain the cables in the desired lateral position while being towed. Alternatively, the seismic cables are maintained at a substantially stationary position in a body of water, either floating at a selected depth or lying on the bottom of the body of water, in which case the source may be towed behind a vessel to generate acoustic energy at varying locations, or the source may also be maintained in a stationary position.

After the reflected wave reaches the streamer cable, the wave continues to propagate to the water/air interface at the water surface, from which the wave is reflected downwardly, and is again detected by the hydrophones in the streamer cable. The water surface is a good reflector and the reflection coefficient at the water surface is nearly unity in magnitude and is negative in sign for pressure signals. The waves reflected at the surface will thus be phase-shifted 180 degrees relative to the upwardly propagating waves. The downwardly propagating wave recorded by the receivers is commonly referred to as the surface reflection or the "ghost" signal. Because of the surface reflection, the water surface acts like a filter, which creates spectral notches in the recorded signal, making it difficult to record data outside a selected bandwidth. Because of the influence of the surface reflection, some frequencies in the recorded signal are amplified and some frequencies are attenuated.

For pressure recording of vertically propagating waves, maximum attenuation will occur at frequencies for which the propagation distance between the detecting hydrophone and the water surface is equal to one-half wavelength and an integer multiple thereof. Maximum amplification will occur at frequencies for which the propagation distance between the detecting hydrophone and the water surface is one-quarter wavelength and odd integer multiples thereof. The wavelength of the acoustic wave is equal to the velocity divided by the frequency, and the velocity of an acoustic wave in water is about 1500 meters/second. Accordingly, the location in the frequency spectrum of the resulting spectral notch is readily determinable. For example, for a seismic streamer at a depth of 7 meters, and waves with vertical incidence, maximum attenuation will occur at a frequency of about 107 Hz and maximum amplification will occur at a frequency of about 54 Hz.

U.S. Pat. No. 7,359,283 issued to Vaage et al. and assigned to an affiliate of the assignee of the present invention describes methods for using streamers having both pressure responsive sensors and motion responsive sensors. By having both types of sensors it is possible to reduce the effects of the ghost on the detected seismic signals. Performing the method described in the Vaage et al. '283 patent in particular requires that signals generated by the motion responsive sensors have their amplitudes adjusted for the angle of incidence of the seismic signals at the time of detection by the motion responsive sensors. Such angle of incidence will depend on, among other factors, the seismic velocities of the various formations below the water bottom and the location of the seismic sensors with respect to the seismic energy source. The method of the Vaage et al. '283 patent may be performed in two dimensions, that is, in a direction along one or more individual streamers, or in three dimensions, that is, for surveys conducted using a plurality of laterally spaced apart streamers towed by a seismic vessel such that angle of incidence is calculated in both the longitudinal (along the streamer) direction and transverse (cross-line) to the streamer direction. In three dimensions, the seismic signals have an angle of incidence at each of the motion responsive sensors on each streamer that depends on the distance of each sensor from the source in both the longitudinal and transverse (cross-line) directions.

The application of the method of the Vaage et al. '283 patent in three dimensions requires sufficiently dense spatial sampling of the seismic signals in both the longitudinal and cross-line directions to avoid spatial aliasing. Spatial aliasing may result in inaccurate estimates of the incidence angle, and thus inaccurate scaling of the motion responsive signals. Incorrect scaling may lead to inaccurate separation of the seismic signals into upgoing and downgoing components. In practice, for marine streamer surveys the spatial sampling interval in the longitudinal direction (along the streamer) is typically 12.5 meters, which is sufficient to limit spatial aliasing effects within the seismic frequency range. However, the spatial sampling (distance between streamers) in the cross-line direction is rarely less than 50 meters and is more often 100 meters. For a 50 meter sampling interval, spatial aliasing is encountered for frequencies above 15 Hz, which is well within the seismic frequency range. Therefore, in order to use the method of the '283 patent in three dimensions extensive interpolation is required in the cross-line direction. Such interpolation can be computationally expensive. However, if the angle of incidence in the cross-line direction is close to vertical, it is possible to use the two dimensional implementation of the method in the '283 patent for the signals from each individual streamer without materially degrading the result. A similar consideration applies to the procedure in the '283 patent for simulating the low frequency part of the motion responsive sensor signal.

Incidence angles of the seismic signals at the receivers will generally decrease with respect to reflected seismic energy travel time because the energy travel path is relatively longer in the vertical direction as contrasted with the distance between the source and each seismic receiver. Furthermore, for typical marine seismic acquisition geometries for which the maximum cross-line offset is of the order of 500 meters or less, incidence angles in the cross-line direction are likely to be very small for deep (long travel time) seismic reflectors. For such seismic reflectors the two dimensional approximation can be used. However, this approximation may not be useful for shallower (smaller seismic travel time) targets.

SUMMARY OF THE INVENTION

This invention generally describes a method for splitting a marine seismic "shot record" into "shallow" and "deep" time parts so as to apply computationally expensive 3-D processing only to the shallow time part that benefits from such processing. 2-D processing may be applied to the deep time part where cross-line incidence angles are sufficiently small.

A method according to one aspect of the invention for determining upgoing pressure components of seismic signals from signals detected by combined pressure responsive sensors and motion responsive seismic sensors disposed in a plurality of laterally spaced apart streamers includes determining a threshold time at which angle of incidence error in the motion responsive signals in the cross-line direction falls below a selected threshold. Below the threshold time, the motion responsive signals are corrected for angle of incidence in the in-line and cross-line directions. Above the threshold time, the motion responsive signals are corrected for angle of incidence only in the in-line direction. Both sets of incidence corrected measured motion responsive signals, and the pressure responsive signals are used to determine upgoing or downgoing pressure components or upgoing or downgoing motion components of the measured motion responsive and pressure responsive seismic signals.

A method for determining upgoing pressure components of seismic signals according to another aspect of the invention includes simulating a response of the pressure responsive sensors and motion responsive sensors to a model of subsurface formations. Upgoing pressure components are determined from the simulated responses along length of seismic streamers, and along and transverse to the length. The upgoing pressure components are compared and in each simulated signal a time is determined when differences between the compared signals fall below a selected threshold. For times below the threshold, measured motion signals are corrected for angle of incidence along the direction of the streamers and transverse thereto to generate first corrected motion signals. For times above the threshold, the motion signals are corrected for angle of incidence along the direction of streamers to generate second corrected motion signals. The first and second corrected motion signals and measured pressure signals are used to determine upgoing or downgoing pressure components or upgoing or downgoing motion components of measured seismic signals.

Other aspects and advantages of the invention will be apparent from the following description and the appended claims.

DETAILED DESCRIPTION

Figure 1:
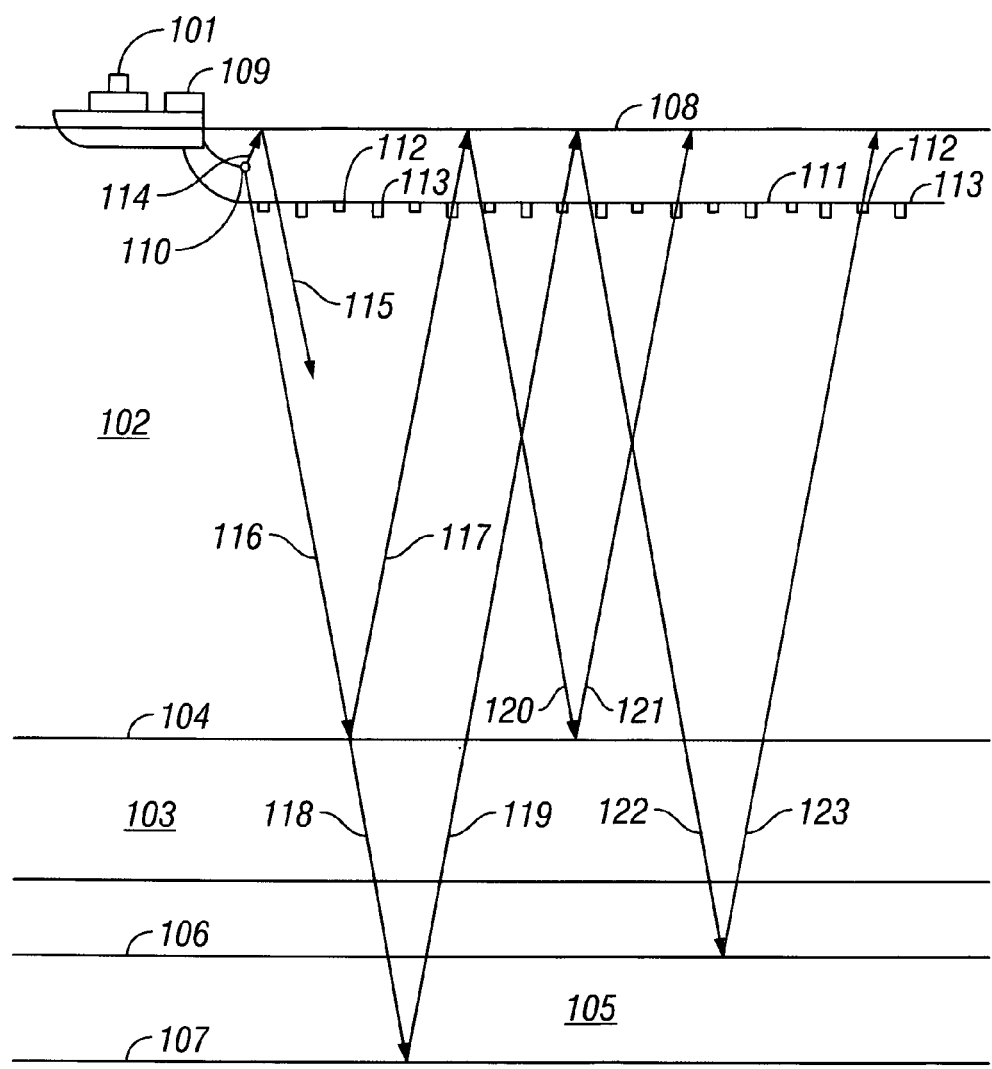
FIG. 1 is an illustration of a method for acquiring marine seismic data that can be used with the method of the invention.

FIG. 1 shows a signal acquisition arrangement (not drawn to scale) for acquiring marine seismic signals that can be used with a method according to the invention. A seismic vessel 101 moves along the surface 108 of a body of water 102 above the earth's subsurface 103. Beneath the water bottom 104, the earth's subsurface 103 contains formations of interest such as layer 105 positioned between an upper boundary 106 and a lower boundary 107. The seismic vessel 101 includes seismic acquisition control equipment, designated generally at 109. The seismic acquisition control equipment 109 includes (none shown separately) navigation control, seismic source control, seismic sensor control, and recording equipment, all of types well known in the art of seismic data acquisition.

The seismic acquisition control equipment 109 causes a seismic source 110 towed in the body of water 102 by the seismic vessel 101 (or by another vessel) to actuate at selected times. The seismic source 110 may be of any type well known in the art of seismic acquisition, including air guns or water guns, or particularly, arrays of air guns. Seismic streamers 111 are also towed in the body of water 102 by the seismic vessel 101 to record the acoustic wavefields initiated by the seismic source 110 and reflected from interfaces in the environment. Although only one seismic streamer 111 is shown in FIG. 1 for illustrative purposes, typically a plurality of seismic streamers 111 are towed behind the seismic vessel 101 at laterally spaced apart positions from the centerline of the vessel 101. Such plurality of streamers and their respective positions will be explained below with reference to FIG. 1A.

Still referring to FIG. 1, the seismic streamers 111 contain sensors to detect the reflected wavefields initiated by the seismic source 110. The seismic streamers 111 include pressure responsive sensors such as hydrophones 112 and water particle motion responsive sensors such as geophones 113. The hydrophones 112 and geophones 113 are typically co-located in pairs or pairs of sensor arrays at selected intervals along the seismic streamers 111. However, the type of sensors 112, 113 and their locations along the seismic streamers 111 are not intended to be a limitation on scope of the present invention.

Each time the seismic source 110 is actuated, an acoustic wavefield travels outwardly in spherically expanding wave fronts. The propagation of the wave fronts will be illustrated herein by ray paths which are perpendicular to the wave fronts. Upwardly traveling wavefield, designated by ray path 114, will reflect from the water-air interface at the water surface 108 and then travel downwardly, as in ray path 115, where the wavefield may be detected by the hydrophones 112 and geophones 113 in the seismic streamers 111. Such a reflection at the water surface 108, as in ray path 115 contains no useful information about the subsurface formations of interest. However, such surface reflections, also known as "ghosts", act in the manner of secondary seismic sources with a time delay.

Downwardly traveling wavefield, in ray path 116, will reflect from the earth-water interface at the water bottom 104 and then travel upwardly, as in ray path 117, where the wavefield may be detected by the hydrophones 112 and geophones 113. Such a reflection at the water bottom 104, as in ray path 117, contains information about the water bottom 104. Ray path 117 is an example of a primary reflection, having one reflection in the subsurface. The downwardly traveling wavefield, as in ray path 116, may transmit through the water bottom 104 as in ray path 118, reflect from a layer boundary, such as 107, of a layer, such as 105, and then travel upwardly, as in ray path 119. The upwardly traveling wavefield, as in ray path 119, may then be detected by the hydrophones 112 and geophones 113. Such a reflection from a layer boundary 107 contains useful information about a formation of interest 105 and is also an example of a primary reflection, having one reflection in the subsurface formations below the water bottom.

However, the acoustic wavefields continue to reflect from interfaces such as the water bottom 104, water surface 108, and layer boundaries 106, 107 in combinations. For example, the upwardly traveling wavefield in ray path 117 will reflect form the water surface 108, continue traveling downwardly in ray path 120, may reflect from the water bottom 104, and continue traveling upwardly again in ray path 121, where the wavefield may be detected by the hydrophones 112 and geophones 113. Ray path 121 is an example of a multiple reflection, also called simply a "multiple", having multiple reflections from interfaces. Similarly, the upwardly traveling wavefield in ray path 119 will reflect from the water surface 108, continue traveling downwardly in ray path 122, may reflect off a layer boundary 106 and continue traveling upwardly again in ray path 123, where the wavefield may be detected by the hydrophones 112 and geophones 113. Ray path 123 is another example of a multiple reflection, also having multiple reflections in the subsurface. Multiple reflections contain redundant information about the formations of interest and commonly are removed from seismic data before further processing.

Figure 1A:
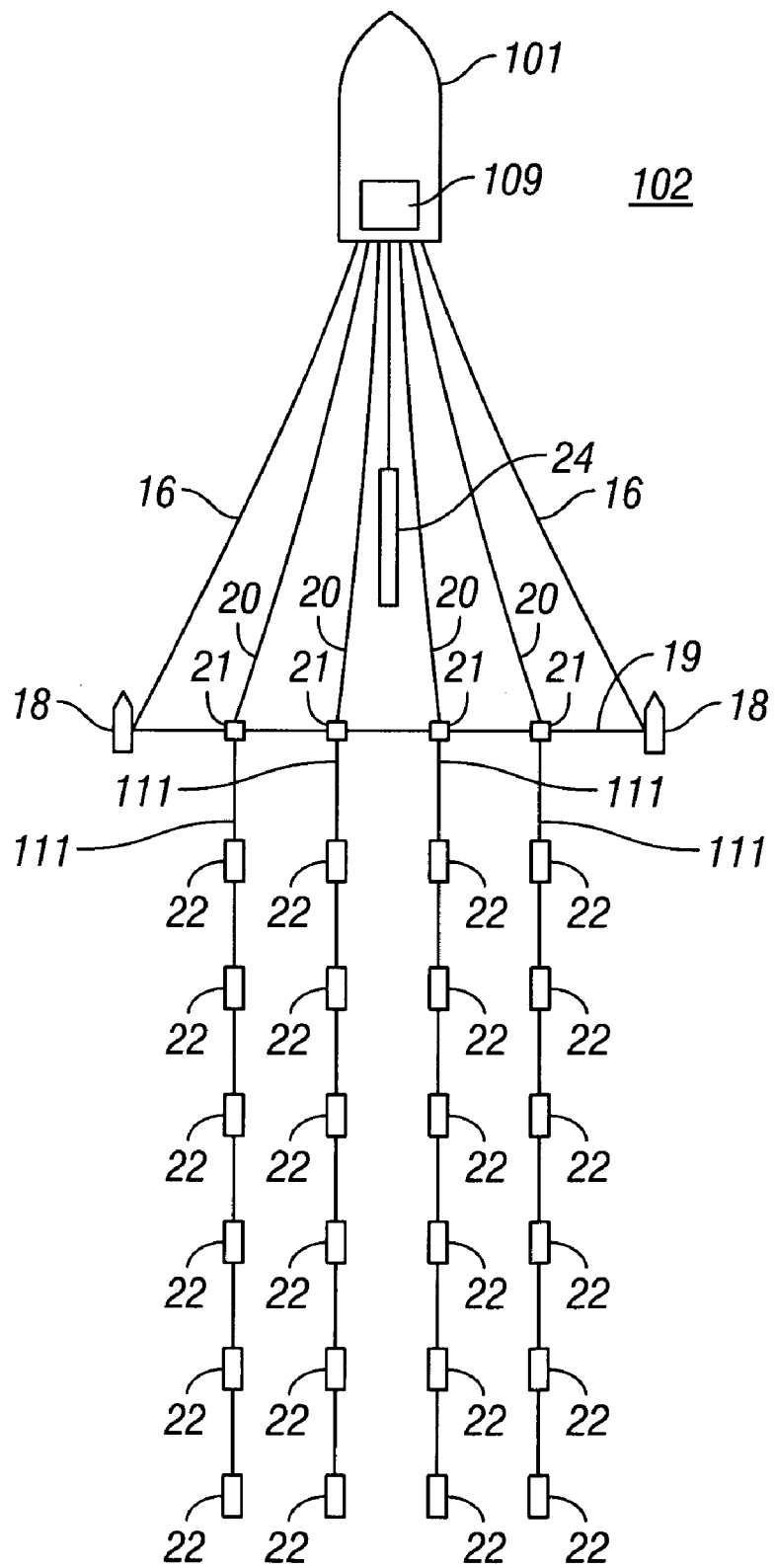
FIG. 1A shows a typical array of laterally spaced apart streamers.

A typical arrangement for acquiring three dimensional seismic data as may be used with methods according to the invention is shown schematically in FIG. 1A. The system may include a plurality of seismic sensor streamers 111 towed by the seismic vessel 101 as shown, or by a different vessel. The streamers 111 extend behind the vessel 101 for a certain distance. Seismic sensors 22 may each be a combination of a pressure responsive sensor (e.g., a hydrophone) and a motion responsive sensor (e.g., a geophone) as explained above with reference to FIG. 1. Geometry of the streamers 111 is maintained by various towing devices including lateral force generating devices called "paravanes" 18 disposed at the end of paravane lead in ropes 16. The streamers 111 are coupled at their forward end to respective termination 21 which couples the streamer 111 to a respective lead in cable 20. The paravane lead in ropes 16 and lead in cables 20 may be deployed from the vessel 101 and retrieved thereon by winches (not shown) or similar spooling device. The lateral separation of the paravanes 18 may be limited by a spreader cable 19 ultimately to maintain the geometry of the entire array of streamers 111.

The seismic vessel 101 may also tow, or another vessel may tow one or more seismic source arrays 24. Only one such array is shown in FIG. 1A for clarity. The source array 24 typically includes a plurality of air guns of various chamber sizes such that upon selectably timed actuations of all the individual air guns in the array 24 a seismic energy pulse of suitable spectral content is imparted to the water 108. The manner of recording the signals detected by the various seismic sensors 22 is well known in the art and will not be further described herein.

The signals from the pressure responsive sensors and the particle motion responsive sensors located in seismic streamers are combined to determine upgoing and downgoing components of the measured pressure signals. Such components are useful for further seismic processing, such as attenuation of multiple reflections in marine seismic signals. Because the particle motion responsive signals are typically affected by low frequency noise due to towing induced vibrations in the streamers, the signal-to-noise ratio for the combined signals would be poor if the signals were merely combined. As explained in the Vaage et al. '283 patent set forth in the Background section herein, however, the particle motion responsive sensor signal may be calculated from the pressure responsive sensor signal within a selected frequency range if the spectrum of the pressure responsive sensor signal has a satisfactory signal-to-noise ratio within such frequency range and if the depths of the pressure responsive sensors and particle motion responsive sensors are known. If the depths to the sensors are unknown, the depth can be calculated from the frequency of spectral notches introduced into the signals by the surface reflection, a process which is well known in the art. It will be appreciated by those skilled in the art that the methods described herein are equally applicable to the calculation of downgoing pressure, and up- and downgoing velocity. Upgoing pressure is only one particular implementation.

The method uses particle motion sensors that are responsive to motions in the particles of the water. In general, particle motion sensors may be responsive to the displacement of the particles, the velocity of the particles, or the acceleration of the particles in the medium. In the present example, particle velocity sensors are preferred. Thus, if motion sensors are used which are responsive to position, then preferably the position signal is differentiated to convert it to a velocity signal by computational means well known in the art. If motion sensors are used which are responsive to acceleration (typically called accelerometers), then preferably the acceleration signal is integrated to convert it to a velocity signal by computational means well known in the art.

In another example, multi-component, e.g., three orthogonal component motion sensors may be used. For clarity only, the present example will be illustrated by the use of geophones, but the disclosed example is not meant to limit the scope of the present invention. In the particular example of a three-component geophone, a geophone is mounted to detect particle velocity in the vertical direction. Such geophone is called a "vertical" geophone. Two geophones are mounted in orthogonal directions with respect to each other, and to the vertically mounted geophone, to detect horizontal motion. Typically, a three-component geophone is oriented to sense motion in the vertical direction, in an in-line direction, and in a cross-line direction. Positioning such geophones in the foregoing three directions enables the propagation direction of an incoming signal to be detected. It also enables the detection of strumming or other mechanical behavior of the seismic cable. For clarity, the method of the invention will be illustrated by the use of vertical geophones, but such example is not meant to limit the scope of the present invention.

Accelerometers could be used as particle motion sensors as an alternative to use of geophones, although the output signal will need to be integrated to obtain velocity. Some accelerometers generate an output signal that is indicative of the variation in orientation of the accelerometer from a selected orientation. Accordingly, if sets of two accelerometers (for situations in which the in-line direction is known) or sets of three accelerometers (if the in-line direction is not known) are utilized, the sensor orientation may be computed and it is not necessary to maintain the accelerometers in a specific orientation.

Part of the method dealing with geophone signal replacement within the frequency range will be described with reference to the flowchart in FIG. 2.

In one example, x (position or space) is a vector and is equal to (x, y), where x represents the direction along the streamers and y represents the transverse ("cross-line") direction. In other examples, as will be explained below, y can be kept constant so that signals from each streamer are analyzed separately. In one example, k (wave number) is a vector and equal to ($k_x$, $k_y$), where $k_x$ is the wave number in the x direction and $k_y$ is the wave number in the y direction. In the method of the invention, time-defined parts of the seismic signals are identified as requiring determining the wavenumber in both the x and y directions, and thus requiring interpolation between the streamers to provide sufficient spatial sampling. Other portions of the seismic signals have cross-line component of the slowness vector sufficiently close to a constant value at the seismic sensors such that $k_y$ can be calculated for each frequency using that constant value and the signals from each streamer can be analyzed separately. The direction could be vertical or any other direction. For the case of zero cross-line slowness, $k_y$ can be fixed at zero.

Figure 2:
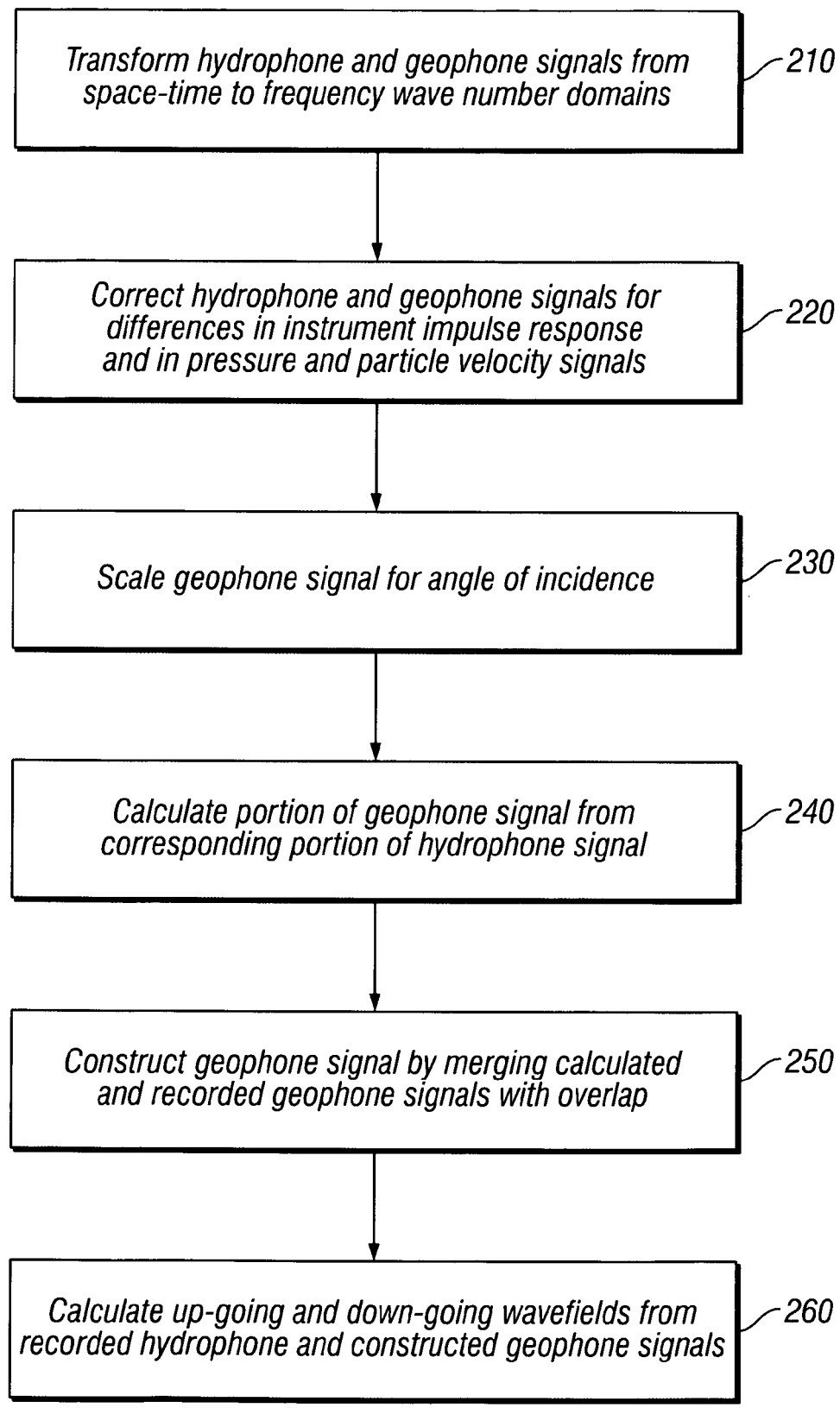
FIG. 2 is a flowchart illustrating the processing steps for combining signals of pressure sensors, e.g., hydrophones and particle motion sensors, e.g., geophones, disposed in a marine seismic streamer.

Referring to FIG. 2, a flow chart outlining an example process for using geophone and hydrophone signals may include, at 210, transforming the hydrophone and geophone signals from the space-time domain to the frequency-wavenumber (f, k) domain. At 220 in FIG. 2, the transformed hydrophone and geophone signals, $H_{(f, k)}$ and $G_{(f, k)}$, respectively, from the domain transform at 210 are corrected for relative differences between the sensor transfer functions, which correspond to sensor impulse responses in the time domain. Such corrections could include, for example, correcting the amplitude and phase of the hydrophone signals to match the geophone signals, correcting the geophone signals to match the hydrophone signals, or correcting both sets of signals to a common basis. Correcting for relative differences in sensor impulse responses is well known in the art. Finally, an amplitude scaling equal to the inverse of the acoustic impedance in the water may be applied to the geophone signals to correct for the relative differences in amplitudes of pressure and particle velocity. Such scaling is also well known in the art.

At 230 in FIG. 2, the corrected geophone signals from 220 are further corrected for angle of incidence. While a hydrophone records the total pressure wavefield, a vertical geophone will only record the vertical component of the particle motion wavefield. The vertical part will be equal to the total particle motion wavefield only for signals which are propagating vertically, i.e. for which the angle of incidence equals zero. For any other angle of incidence the geophone signals need to be scaled, for example, substantially as described in the Vaage et al. '283 patent.

At 240 in FIG. 2, a low frequency part of the geophone signal can be calculated or estimated from the recorded hydrophone signal. The foregoing may also be performed substantially as explained in the Vaage et al. '283 patent.

At 250 in FIG. 2, a full bandwidth geophone signal can be calculated or estimated by merging the calculated low frequency portion thereof with the measured geophone signals in an upper part of the frequency spectrum, including some overlap. The foregoing may also be performed substantially as explained in the Vaage et al. '283 patent.

At 260 in FIG. 2, a full bandwidth geophone data set and the recorded hydrophone data set are added or subtracted to calculate a full bandwidth upgoing and downgoing wavefield. The foregoing can be performed substantially as explained in the Vaage et al. '283 patent.

In a method according to the invention, it is desirable to identify time-defined parts of the seismic signals that require scaling of the geophone signals in both the x and y directions (3D processing) and other parts of the seismic signals that can be processed using scaling only in the x direction (2D processing) without loss of accuracy. In identifying such parts of the seismic signals, methods according to the invention make use of the facts that typical seismic sensor arrays (e.g., FIG. 1A) have much longer distances between the seismic energy source and particular seismic sensors in the longitudinal direction, and that the angle of incidence of seismic signals at any particular seismic sensor decreases with respect to seismic energy travel time (and corresponding depth) to a seismic reflector in the subsurface.

An explanation of how to identify such time-defined portions of the seismic signals, and how subsequent signal processing techniques can be performed will now be given with reference to FIG. 3. At 300, motion responsive seismic sensor signals (e.g., geophone signals) and pressure responsive seismic sensor signals (e.g., hydrophone signals) may be synthesized or "modeled." Such modeling should include representations of rock formations having spatial acoustic impedance distribution that is reasonable for the area of the subsurface being surveyed. Modeling techniques are known in the art and will result in seismic sensor signals that would have been obtained if the subsurface rock formations had the same acoustic impedance distribution that was used in the model.

In the present example, at 301, the synthesized geophone and hydrophone signals may be transformed to the frequency wave number (f, k) domain. At 302, the domain-transformed synthetic signals may be processed by scaling the geophone signals in the f, $k_x$, $k_y$ domain, that is, equivalent to scaling where the angle of incidence of the seismic energy with respect to each sensor is estimated in two orthogonal component directions (3D). At 303, the geophone signals may be transformed to the f, k domain and scaled in the f, $k_x$ domain (2D), at 306. Scaling, at 302 and 306, may be performed, for example, as explained in the Vaage et al. '283 patent referred to earlier herein to correct the geophone signals for the angle of incidence of the seismic energy.

At 304 and 308, respectively, the scaled geophone signals may be used with the hydrophone signals to estimate upgoing pressure signals for 3D and 2D. The 3D and 2D upgoing pressure signals may be compared to each other, at 314, and a time value in each of the compared signals may be determined above which the differences between the 3D and 2D upgoing pressure signals fall below a selected threshold. Methods for comparing the 3D and 2D upgoing pressure signals may include, for example, measuring normalized root mean squared ("RMS") differences between signal amplitudes, cross correlating the 3D and 2D signals and determining a relative time shift between the signals derived using the 3D and 2D modeling. The foregoing attributes are widely used for measuring the repeatability of time lapse seismic surveys, which are multiple seismic surveys performed on the same subsurface volume. Thus, the threshold for the foregoing attributes may be selected, for example, such that the systematic error arising from the 2D approximation should be small compared to the repeatability obtainable between two separate seismic surveys performed on the same volume of the subsurface.

In some examples, the 2D and 3D estimates are not compared to each other but are compared to a common reference which is modeled in a manner similar to the hydrophone and geophone signals used to derive the estimates.

A result of the foregoing process will be an output data set, at 316 including an identification of the particular streamer used in the model, the position of the particular seismic receiver (combination hydrophone/geophone) on each streamer for which the signals were synthesized, and a time value above which the differences fall below the selected threshold. Such time may be referred to as $t_{max\text{-}3D}$ to represent the maximum time for which 3D seismic data processing is desirable.

Figure 4:
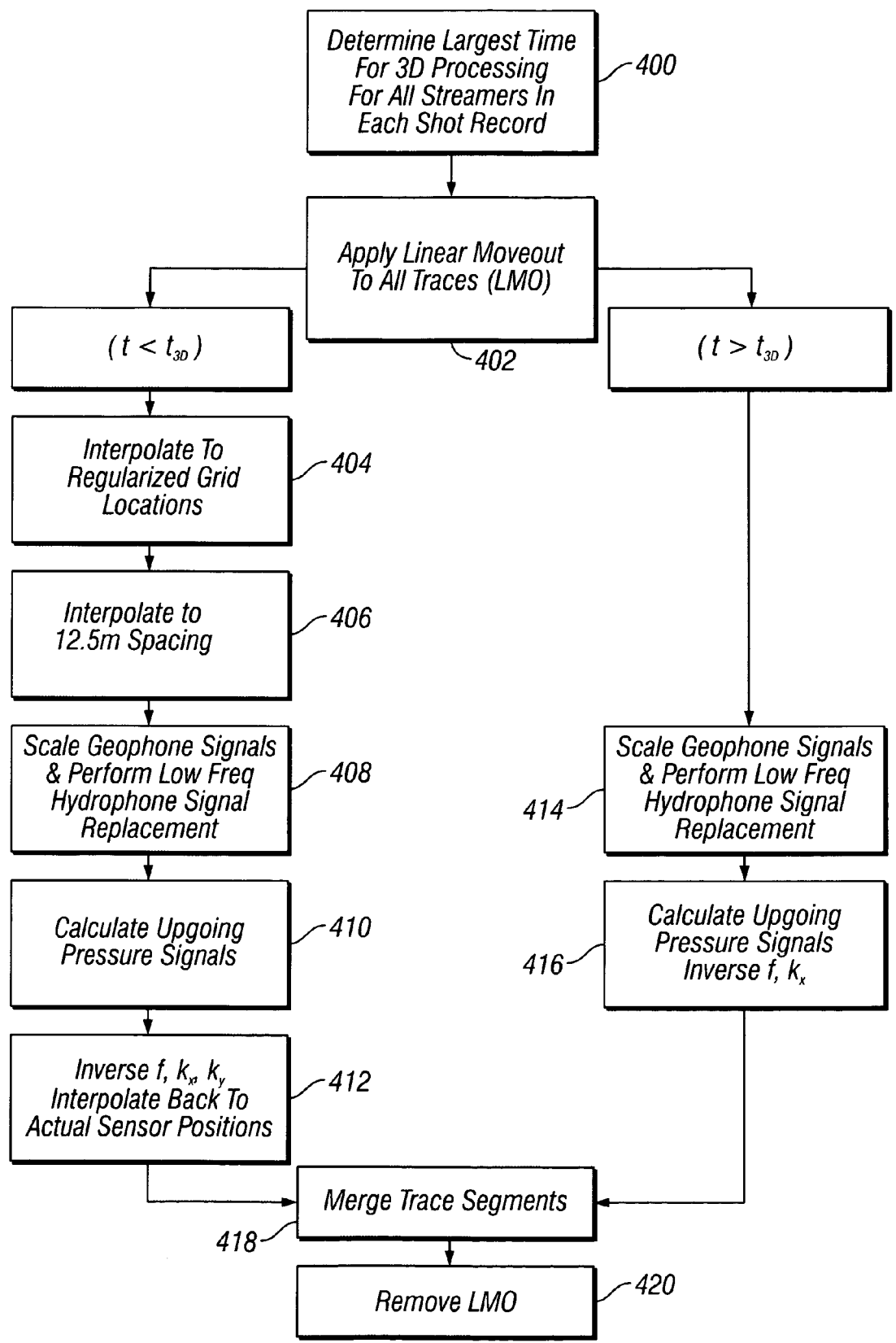
FIG. 4 is a flow chart of another part of the example method of FIG. 3.

Referring to FIG. 4, after the foregoing identification of $t_{max\text{-}3D}$ for each seismic receiver position, the seismic signals actually recorded may be examined. Such signals, as explained above with reference to FIGS. 1 and 1A will include pressure responsive signals and motion responsive signals for each sensor set (e.g., 22 in FIG. 1A). Using the time values determined as explained above, a value of $t_{max\text{-}3D}$ may be indexed to signals from each receiver position on each seismic streamer. At 402, a linear moveout may be applied to the recorded seismic signals from each sensor. Linear moveout may be characterized as a time shift that is proportional to the distance between the particular seismic sensor and the seismic energy source. Linear moveout is therefore equivalent to a velocity of a seismic wave traveling in the horizontal direction. The linear moveout ("LMO") may be selected to minimize the largest value of $t_{max\text{-}3D}$ for each streamer. Typically, LMO will be applied only in the in-line direction, and will therefore be the same for each streamer. One example technique for selecting LMO "velocity" is to select a seismic event in the recorded signals that defines $t_{max\text{-}3D}$ and determine a critical offset for which the travel time of that event equals $t_{max\text{-}3D}$. Then determine a seismic travel time for the same seismic event in the signals of the seismic sensor closest to the seismic source (nearest offset) and choose LMO velocity that causes the travel time of the event at the critical offset to match the travel time of the same event at the near offset. In practice there will be an upper limit to LMO velocity that can be successfully applied. Such upper limit may be defined by the point at which the shearing of the signal "cone" in f-k space is such that spatial aliasing occurs for low incidence angles.

For time values in each seismic signal below $t_{max\text{-}3D}$ as adjusted by the LMO, at 404 in FIG. 4, the time portions of the seismic signals subject to 3D processing should be interpolated to provide seismic signals that would have been obtained had the streamer array (FIG. 1A) been disposed in the water such that the sensors were evenly spatially distributed (called "regularization"). Such regularization is desirable because actual seismic sensor positions in the water may depart from even spatial distribution as a result of wave action and water currents, for example, and may be necessary when using a fast Fourier transform for performing the transform of the seismic signals to the f, k domain. At 406, the regularized seismic signals may then be interpolated to 12.5 meter (or similar) cross-line spacing. Interpolation provides estimates of seismic signals that would have been recorded had actual seismic sensors been positioned at the interpolated locations. Such interpolation is desirable, as explained above, to reduce aliasing caused by spatial undersampling of the seismic signals in the cross-line direction. The value of 12.5 meters may be selected such that the cross-line spatial sampling is substantially the same as the longitudinal (along the streamer) spatial sampling, as that is typical spacing between seismic sensor positions on marine seismic streamers. At 408, the motion responsive seismic signals (geophone signals) may be scaled for angle of incidence, and the low frequency portion of the geophone signals may be replaced as explained in the Vaage et al. '283 patent. Such scaling and replacement may be performed in the f, $k_x$, $k_y$ domain. Because LMO had been applied to the signals previously, the incidence angle calculation in equation 2 of the '283 patent should be modified as follows:

$$\cos(\phi) = \sqrt{1 - \frac{v^2 \cdot \left[\left(k_x + \frac{f}{v_{LMO}}\right)^2 + k_y^2\right]}{f^2}}$$

In which $\phi$ represents the angle of incidence and $v_{LMO}$ represents the LMO velocity used to perform the LMO. The above revised expression should also be used for calculating the time delay (equation 8 in the '283 patent) used in the low frequency geophone simulation. This formula applies for the normal case where LMO is applied only in the inline direction.

Figure 3:
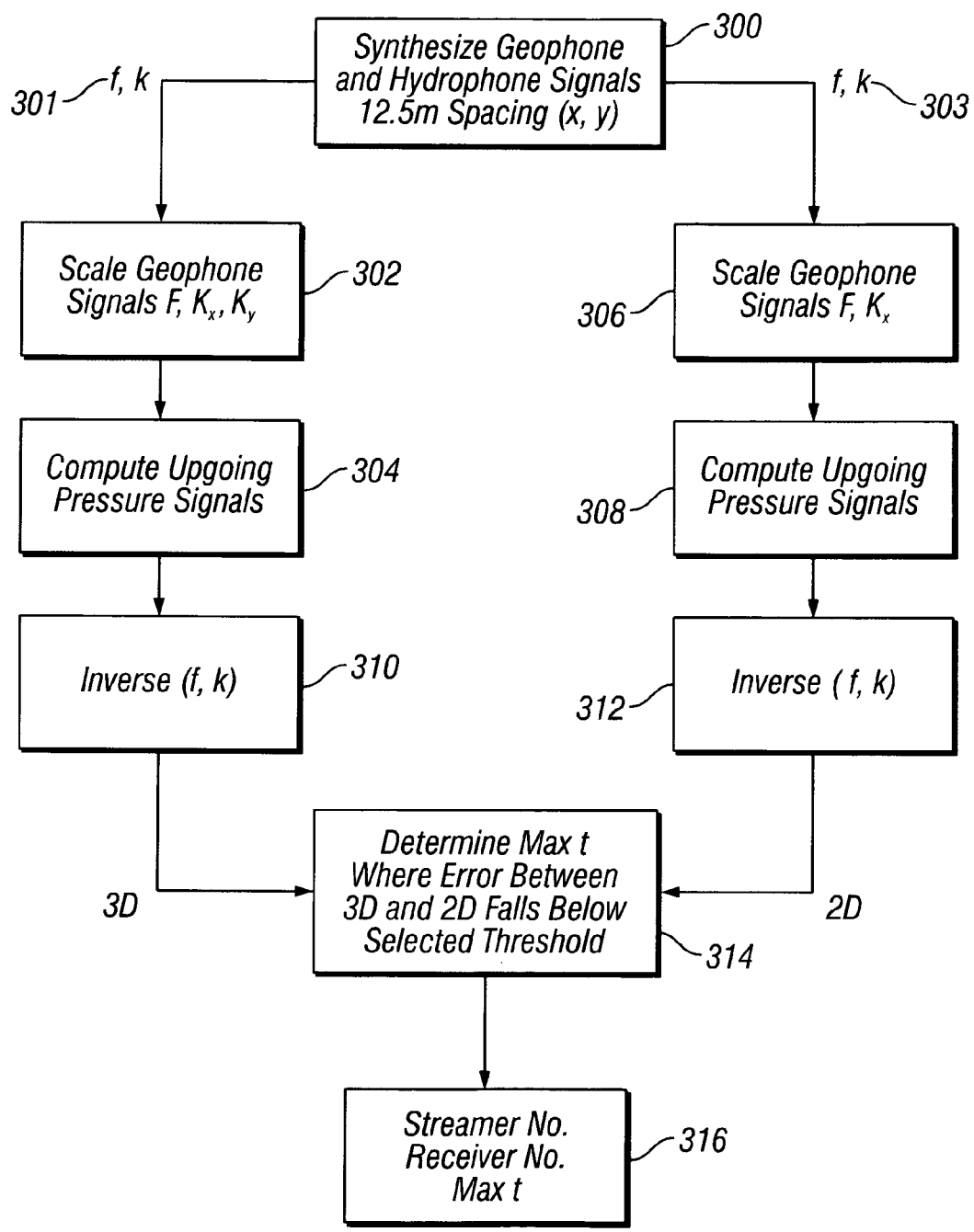
FIG. 3 is a flow chart of part of an example method.
Figure 5:
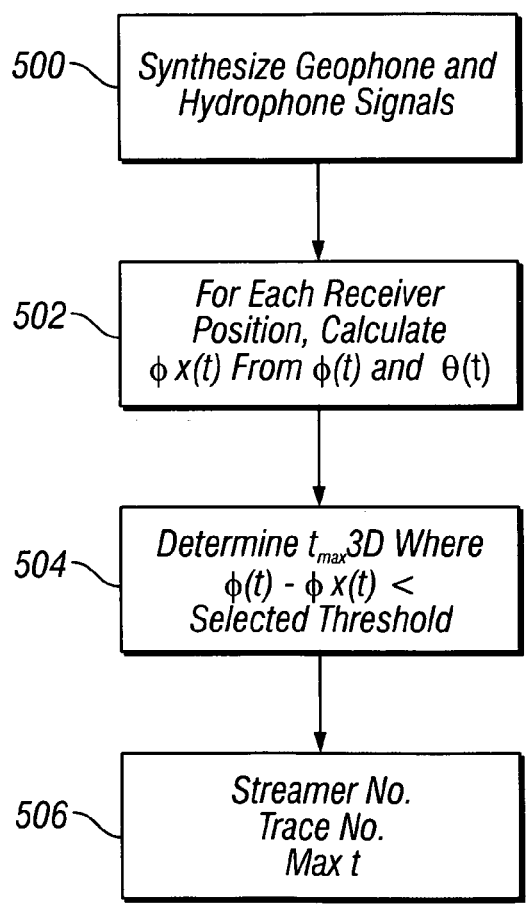
FIG. 5 is an alternative example of the method part shown in FIG. 3.

Referring to FIG. 5, an alternative technique to select the value of $t_{max\text{-}3D}$ includes at 500 modeling seismic signals, which may be performed substantially the same way as the synthesis at 300 in FIG. 3. At 502, an angle of incidence of the seismic signals in the longitudinal direction $\phi x(t)$ at each receiver station for each event of interest as a function of time may be determined. Such angle may be determined from the longitudinal component of the slowness vector associated with that event. At 504, time values, in each seismic signal may be determined such that differences between the angle $\phi x(t)$ and the angle $\theta(t)$ (the angle of incidence of seismic energy in the transverse direction) fall below a selected threshold. Such time values may be used as $t_{max\text{-}3D}$ for each seismic signal. An output of the foregoing process, at 506 will provide the same parameters as the process shown in FIG. 3.

Referring once again to FIG. 4, having scaled the geophone signals and using hydrophone signals, it is then possible, at 410, to calculate an upgoing pressure signal at each sensor position. Such upgoing pressure signals may be calculated as explained in the Vaage et al. '283 patent and as illustrated with reference to FIG. 2. At 412, the upgoing pressure signals are transformed from the frequency-wave (f, k) number domain back to the space-time (x, t) domain. A result of the foregoing process is upgoing pressure signals during the time interval from zero (source actuation time) to the value of $t_{max\text{-}3D}$.

In conjunction with processing the portions of the recorded seismic signals at times greater than $t_{max\text{-}3D}$ may be 2D processed, at 414, by scaling the geophone signals and performing low frequency signal replacement for each geophone signal, substantially as explained above. The foregoing 2D processing does not require regularization or interpolation. The cross-line wavenumber $k_y$ may be calculated for each frequency using a constant cross-line slowness which will be zero for the case where cross-line slowness is assumed to be zero. At 416, hydrophone signals and processed geophone signals may be combined as explained in the Vaage et al. '283 patent to determine upgoing pressure signals. Such upgoing pressure signals may then be inverse transformed to the space-time domain. A result of the foregoing process is upgoing pressure responsive seismic signals from $t_{max\text{-}3D}$ and ending at the end time of signal recording. At 418, the 3D processed signals both before (3D processed) and after (2D processed) $t_{max\text{-}3D}$ are merged. At 420, the LMO may be removed from the merged segments to provide fully processed upgoing pressure responsive signals.

While the foregoing example is described in terms of determining an upgoing pressure signals, it will be appreciated by those skilled in the art that it is also possible to use the method described herein to determine downgoing pressure signals, or upgoing or downgoing motion or velocity signals, as is well described in the Vaage et al. '283 patent.

Methods for processing "dual sensor" seismic signals according to the invention may reduce the computational expense associated with seismic signal interpolation in the cross-line direction.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining upgoing pressure components of seismic signals from signals detected by combined pressure responsive sensors and motion responsive seismic sensors disposed in a plurality of laterally spaced apart streamers, comprising:
   determining a threshold time at which angle of incidence error in the detected motion responsive signals in a direction transverse to a length of the streamers falls below a selected threshold;
   for times less than the threshold time, correcting the detected motion responsive signals for angle of incidence along the direction of the seismic streamers and transverse thereto to generate first corrected motion responsive signals;
   for times greater than the threshold time, correcting the detected motion responsive signals for angle of incidence along the direction of the seismic streamers to generate second corrected motion responsive signals; and
   using the first and second corrected motion responsive signals and the pressure responsive signals to determine at least one of upgoing and downgoing pressure components and upgoing and downgoing motion components of the measured motion responsive and pressure responsive seismic signals.

2. The method of claim 1 wherein the threshold time is determined by simulating a response of the pressure responsive sensors and the motion responsive sensors in both two dimensions and in three dimensions, and determining a time above which differences between the three dimensional response and the two dimensional response fall below a selected threshold.

3. The method of claim 2 further comprising applying a linear moveout to the detected pressure responsive and motion responsive signals.

4. The method of claim 3 wherein the linear moveout is selected such that arrival time of a selected seismic event is substantially the same at both a near offset sensor position and at a far offset sensor position.

5. The method of claim 2 wherein the threshold time is selected by simulating travel paths of seismic energy from a seismic energy source to each sensor position on each of the streamers and determining a time at which angle of incidence of seismic energy in the transverse direction falls below a selected threshold.

6. The method of claim 1 wherein the using the first and second corrected signals comprises simulating a response of the motion responsive sensors within a selected frequency range using the detected pressure responsive signals, excluding portions of the detected motion responsive signals in the selected frequency range and combining the pressure responsive simulation of the motion responsive sensors in the selected frequency range with the detected motion responsive signals excluding the portions in the selected frequency range.

7. The method of claim 1 wherein the determining first and second corrected signals and using the first and second corrected signals are performed in the frequency-wave number domain.

8. A method for determining upgoing pressure components of seismic signals from signals detected by combined pressure responsive sensors and motion responsive seismic sensors, comprising:
   simulating a response of the pressure responsive sensors and the motion responsive sensors to a model acoustic impedance distribution of subsurface formations;
   determining upgoing pressure components from the simulated responses in a direction corresponding to a length of seismic streamers and in a direction transverse thereto;
   comparing the determined upgoing pressure components and determining in each simulated signal a threshold time at which differences between the compared signals falls below a selected threshold;
   for times less than the threshold time, correcting measured motion responsive signals for angle of incidence along the direction corresponding to the length of the seismic streamers and transverse thereto to generate first corrected motion responsive signals;
   for times greater than the threshold time, correcting the measured motion responsive signals for angle of incidence along the direction corresponding to the length of the seismic streamers to generate second corrected motion responsive signals; and
   using the first and second corrected measured motion responsive signal and measured pressure responsive signals to determine at least one of upgoing and downgoing pressure components and upgoing and downgoing motion components of the measured motion responsive and pressure responsive seismic signals.

9. The method of claim 8 further comprising applying a linear moveout to the detected pressure responsive and motion responsive signals.

10. The method of claim 9 wherein the linear moveout is selected such that arrival time of a selected seismic event is substantially the same at both a near offset sensor position and at a far offset sensor position.

11. The method of claim 8 wherein the threshold time is selected by simulating travel paths of seismic energy from a seismic energy source to each sensor position on each of the streamers and determining a time at which angle of incidence of seismic energy in the transverse direction falls below a selected threshold.

12. The method of claim 8 wherein the using the first and second corrected signals comprises simulating a response of the motion responsive sensors within a selected frequency range using the detected pressure responsive signals, excluding portions of the detected motion responsive signals in the selected frequency range and combining the pressure responsive simulation of the motion responsive sensors in the selected frequency range with the detected motion responsive signals excluding the portions in the selected frequency range.

13. The method of claim 8 wherein the determining first and second corrected signals and using the first and second corrected signals are performed in the frequency-wave number domain.

* * * * *